US006079684A

United States Patent [19]

Korth

[11] Patent Number: 6,079,684

[45] Date of Patent: Jun. 27, 2000

[54] STEP LADDER BRACKET

[76] Inventor: Thomas G Korth, 46584 Springwood Dr., Macomb Township, Mich. 48044

[21] Appl. No.: 09/342,346

[22] Filed: Jun. 29, 1999

Related U.S. Application Data

[63] Continuation-in-part of application No. 09/123,618, Jul. 28, 1999.

[51] Int. Cl.[7] .............................. E06C 7/14; A47F 5/00; F16B 45/00

[52] U.S. Cl. .............................. 248/300; 204/210

[58] Field of Search .............................. 248/200, 210, 248/211, 238, 300, 301, 304, 309.1, 316.8, 312.1, 343; 211/87.01, 74.01; 182/93

[56] References Cited

U.S. PATENT DOCUMENTS

| | | | |
|---|---|---|---|
| D. 162,122 | 2/1951 | Broeren | D6/518 |
| D. 184,508 | 3/1959 | Burt | D8/373 |
| D. 266,328 | 9/1982 | Fleshman | D15/144 |
| 809,441 | 1/1906 | Hanks | 131/257 |
| 1,166,859 | 1/1916 | Schroeder | 182/93 |
| 1,209,184 | 12/1916 | Markwell | 248/216.4 |
| 1,674,619 | 6/1928 | Dover | 211/105.2 |
| 2,286,118 | 6/1942 | Sleeth | 248/58 |
| 2,766,958 | 10/1956 | Levy | 248/220.41 |
| 3,069,019 | 12/1962 | Schuster | 211/73 |
| 3,294,356 | 12/1966 | Sherman | 248/476 |
| 3,318,561 | 5/1967 | Finke et al. | 248/218.4 |
| 4,069,412 | 1/1978 | Jacob | 248/493 |
| 4,257,492 | 3/1981 | Rasada | 182/206 |
| 4,333,625 | 6/1982 | Haug | 248/216.1 |
| 4,591,058 | 5/1986 | Amstutz et al. | 211/94 |
| 4,858,871 | 8/1989 | Romano | 248/339 |
| 4,880,200 | 11/1989 | Champagne et al. | 182/93 |
| 5,328,139 | 7/1994 | Barnes | 248/475.1 |
| 5,624,095 | 4/1997 | Zissu | 248/231.81 |
| 5,697,506 | 12/1997 | Peickert | 211/71 |

*Primary Examiner*—Anita M. King
*Assistant Examiner*—Michael Nornberg
*Attorney, Agent, or Firm*—Peter D. Keefe

[57] ABSTRACT

A step ladder bracket which easily, safely and stably supports a step ladder with respect to a wall. The step ladder bracket includes a back plane for flatly abutting a vertical wall surface, a stiffening flange formed at an upper end of the back plane, and at least one support flange formed adjacent a lower end of the back plane. The step ladder bracket is formed of a single piece of planar material. The stiffening flange projects from a forward facing side of the back plane, and is preferably oriented perpendicular thereto and extends along the entire length of the back plane to provide stiffening and an abutment to an already level object. The one or more support flanges also project from the forward side of the back plane, and are oriented at an acute angle with respect thereto. The one or more support flanges have a length less than the length of the back plane and are defined by left and right flange edges which, preferably, are mutually convergent. In operation, a user hocks the perimeter lip of a step ladder onto the support flange.

5 Claims, 3 Drawing Sheets

STEP LADDER BRACKET

CROSS-REFERENCE TO RELATED APPLICATIONS

The present application is a continuation-in-part application of application Ser. No. 09/123,618, filed on Jul. 28, 1999 and which is currently pending.

BACKGROUND OF THE INVENTION

1. Field of the Invention

The present invention relates to brackets for supporting articles with respect to a wall. More particularly, the present invention relates to a bracket for supporting step ladders in a stable manner with respect to a wall.

2. Description of the Prior Art

Step ladders utilize a two sided structure, wherein typically one of the sides (the stepped side) carries a number of steps and the other side (the brace side) serves as bracing for the stepped side. In the case of metallic construction (usually aluminum) step ladders, the stepped side is non-pivotally connected, such as by riveting, to a perimeter lip of a top step. The brace side is pivotally connected to the perimeter lip of the top step, again such as by riveting. In operation, the step ladder is stored in a collapsed configuration wherein the brace side is pivoted against the stepped side, and, when the step ladder is to be used, the brace side is pivoted away from the stepped side, thereby forming an A-shaped configuration.

Step ladders while extremely useful, can be a little problematic when it comes time to store them. To lean a step ladder against a wall when in the collapsed configuration requires it to be leaned at an acute angle with the wall, wherein the top step rests against the wall and the foot of each of the stepped and brace sides are spaced away from the wall. This storage placement takes up too much floor space and invites the step ladder being inadvertently knocked over as things are moved about the floor.

The perimeter lip provides a natural location for hookingly engaging the step ladder to an upturned hook so as to dependingly support it therefrom. Therefore, someone may try to hang a step ladder, when in its storage configuration, off of a hook anchored into a wall. Yet, this is very unsuitable because unless by accident this person hung the step ladder right at a bisection passing through the center of gravity of the step ladder, the step ladder will untowardly list and, in any event, will be subject to precarious holding on the hook.

Even if someone were to use two mutually spaced apart hooks, the hooks would need to be installed individually and yet be horizontally even with each other and not be spaced too close together (as to create ladder support instability) or too far apart (as to prevent both hocks from simultaneously engaging the perimeter lip). In the case of two spaced apart hooks, it may be difficult to simultaneously engage both hooks to achieve a stable holding of the ladder against the wall, since the ladder itself may impair viewing of the hooks when hanging is attempted.

Accordingly, what remains needed in the art is a bracket specifically adapted for the stable hanging of step ladders on a wall.

SUMMARY OF THE INVENTION

The present invention is a step ladder bracket which easily, safely and stably supports a step ladder with respect to a wall.

The step ladder bracket according to the present invention includes a back plane for flatly abutting a vertical wall surface, a stiffening flange formed at an upper end of the back plane, and at least one support flange formed adjacent a lower end of the back plane. The step ladder bracket is formed of a single piece of planar sheet material.

The stiffening flange projects from a front side of the back plane, and is preferably oriented perpendicular thereto to provide stiffening and an abutment to an already level object, for example a ceiling. The stiffening flange extends preferably along the entire length of the back plane. The one or more support flanges also project from the front side of the back plane, and are oriented at an acute angle with respect thereto. The one or more support flanges have a length less than the length of the back plane and are defined by left and right flange edges which are preferred to be mutually convergently angled to facilitate ease of hooking placement of a perimeter lip of a ladder thereupon.

In the preferred embodiment, the planar material is formed of a metallic sheet, wherein the stiffening flange is formed by a bending step, and wherein the one or more support flanges are formed by a two step process including a cutting step to provide the corresponding right and left flange edges (and corresponding left and right back plane edges) and a bending step.

The rear side of the back plane abuts, and is mounted to, a vertical support, be that a wall or studs, wherein the back plane is provided with holes which are spaced to coincide, preferably, with standard stud spacing (i.e., 16 inches on center).

Accordingly, it is an object of the present invention to provide a step ladder bracket which is automatically leveled and assuredly holds a step ladder snugly against a wall in a stable manner.

It is a further object of the present invention to provide a step ladder bracket wherein a user can easily engage and disengage the perimeter lip of the top step thereof with the step ladder bracket.

These, and additional objects, advantages, features and benefits of the present invention will become apparent from the following specification.

DETAILED DESCRIPTION OF THE PREFERRED EMBODIMENT

Figure 1:
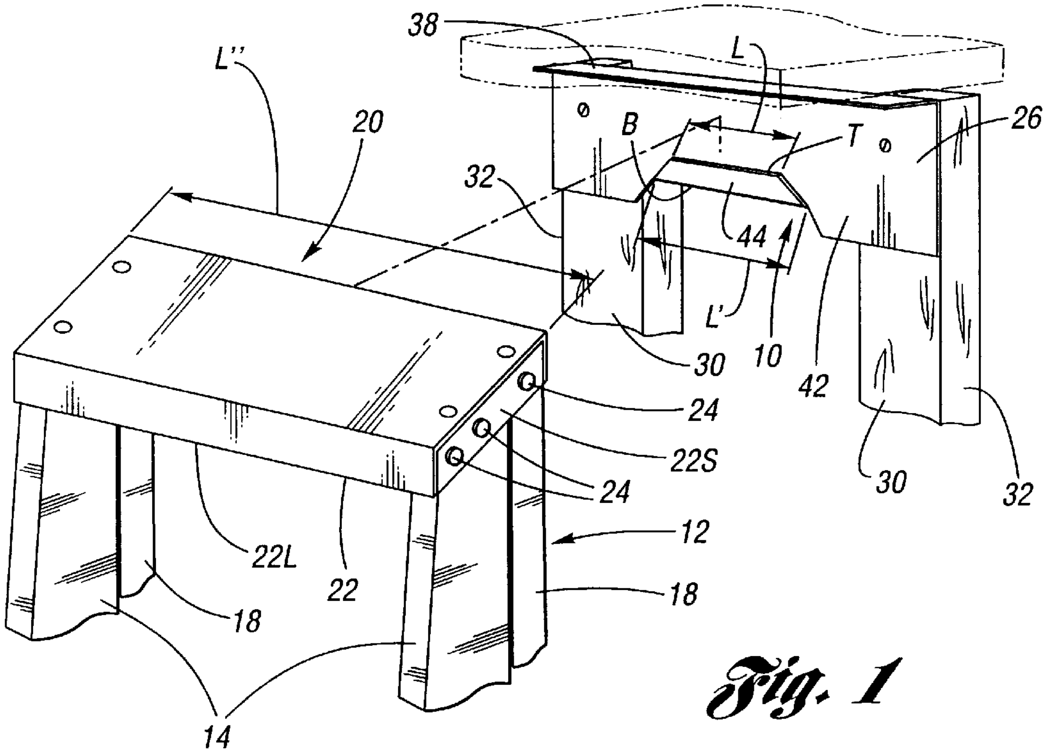
FIG. 1 is an exploded perspective view of a step ladder and a step ladder bracket according to a first form of the present invention.
Figure 2:
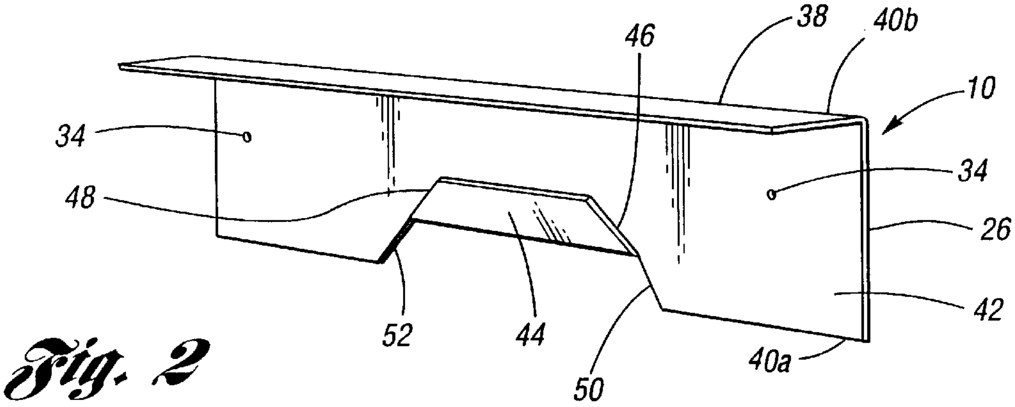
FIG. 2 is a perspective front view of the step ladder bracket shown at FIG. 1.

Referring now to the Drawing, FIGS. 1 and 2 depict a step ladder bracket 10 according to a first form of the present invention in association with a conventional aluminum step ladder 12.

The step ladder 12 has a stepped side 14 having a number of steps 16, and further has a brace side 18 which serves as bracing for the stepped side. The step ladder 12 includes a top step 20, wherein the top step has a downwardly directed perimeter lip 22. The top step is rectangular, wherein the perimeter lip 22 has a pair of mutually opposed long lip sections 22L and a pair of mutually opposed short lip sections 22S. The stepped side 14 is non-pivotally connected, such as by riveting 24, to the short lip sections 22S of the perimeter lip 22, and the brace side 18 is pivotally connected to the short lip sections, also for example by riveting. The step ladder 12 is shown in its collapsed configuration for storage, wherein the brace side 18 is pivoted to a position abuttably against the stepped side 14.

As also shown at FIG. 2, the step ladder bracket 10 is formed as a single piece of sheet material and includes a back plane 26 having a rear side 28 for flatly abutting any suitable vertical wall member 30 (which may be provided by a wall facia, such as for example wall board or paneling, or may be provided by exposed wan studs 32). The back plane 26 preferably extends long enough to overlappingly span the distance between studs 32 (usually 16 inches on center) so that the back plane may be fastened directly into the studs. In this regard, the back plane 26 is provided with at least two spaced apart holes 34, wherein a respective threaded fastener 36 (as for example a wood screw) passes therethrough so as to hold the back plane abuttingly against the wall surface 30. Preferably, for reasons of stability, the holes 34 are placed closer to the upper end 40*b* than to the bottom end 40*a* of the back plane 26.

A stiffening flange 38 is formed at the upper end 40*b* of the back plane 26. The stiffening flange 38 projects from a front side 42 of the back plane 26 at a preferred angle of ninety degrees with respect thereto. The stiffening flange 38 extends preferably along the entire length of the back plane 26. The stiffening flange 38 serves to keep the back plane 26 straight, as it serves to stiffen the back plane in order to prevent it from bending. The stiffening flange 38 further serves to automatically level the back plane 26 when the stiffening flange is placed abuttingly against a ceiling 25 or some other already level, fixed and protruding object, such as a 2×4 cross member.

Adjacent the bottom end 40*a* of the back plane 26, a support flange 44 projects from the front side 42 thereof at an acute angle A with respect thereto, wherein the support flange angles upwardly (i.e., angles toward the upper end 40*b*). The support flange 44 has a length L along the distal tip T and a length L' along the base B which are less than the length L" of a long lip section 22L of the perimeter flange 22 of the step ladder 12 so that the support flange may be placed onto a long lip section between the short lip sections 22S located at either end thereof. Further, the length L' of the support flange 44 along the base B thereof should be long enough to stably support a step ladder, such as for example at least about four inches, yet not be too long to not fit on a long lip section between the short lip sections 22S, such as for example less than about eight inches.

In that the length of the back plane 26 is preferably sufficient to overlap typically spaced studs 32, the length L' along the base B of the support flange 44 is less than the length of the back plane. In this regard, the support flange 44 is defined by left and right flange edges 46, 48 which, respectively, correspond with left and right back plane edges 50, 52 (see FIG. 2).

It is preferred for the left and right flange edges 46, 48 to be mutually convergently angled (mutually converging from the base B toward the distal tip T). In this regard the length L' along the base B (where the support flange is bent) is longer than the length L along the tip T. The convergency of the flange edges 46, 48 serves to make initial interfacing of the long lip section 22L of the perimeter lip 22 with the support flange 44 easier, in that there is less chance of interferences by the short lip sections 22S at either end thereof. It is also preferred for the corresponding left and right back plane edges 50, 52 to be divergently angled such as via a V-shaped cut made in the back plane at each of the left and right flange edges.

In the preferred embodiment of the step ladder bracket 10, the planar material thereof is formed of a metallic sheet, such as for example painted steel or aluminum. In this preferred embodiment, the stiffening flange 38 is formed by a bending step to provide the aforementioned perpendicular angle thereof, and the support flange 44 is formed by a two step process including a cutting step to provide the right and left flange edges 46, 48 and the corresponding right and left back plane edges 50, 52 and a bending step to provide the aforementioned acute angle thereof.

Figure 3:
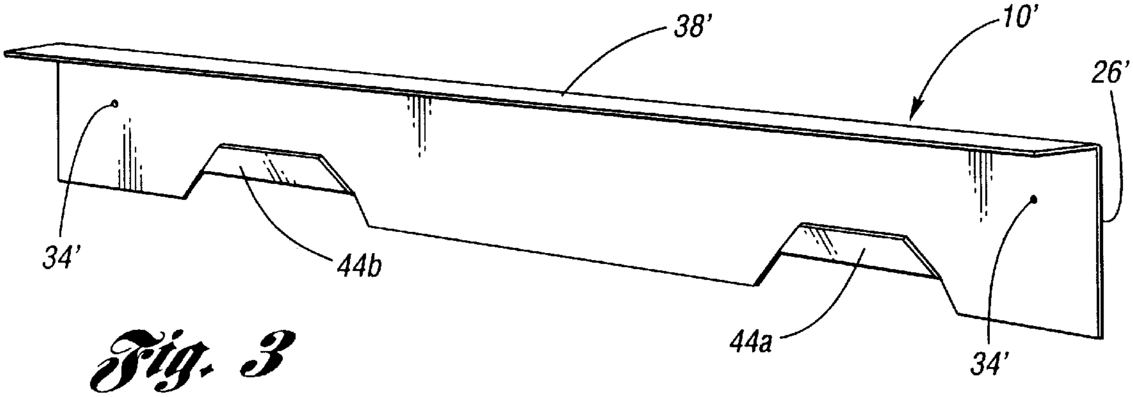
FIG. 3 is a perspective view of a step ladder bracket according to a second form of the present invention.

FIG. 3 shows a second preferred form of the step ladder bracket 10' having a back plane 26', a stiffening flange 38' and two laterally separated support flanges 44*a*, 44*b* which are each formed in the manner of the aforesaid support flange 44. The length of the back plane 26' is sufficient now to span three successive studs, wherein two holes 34' are provided for fastening to the two outer studs.

Figure 5:
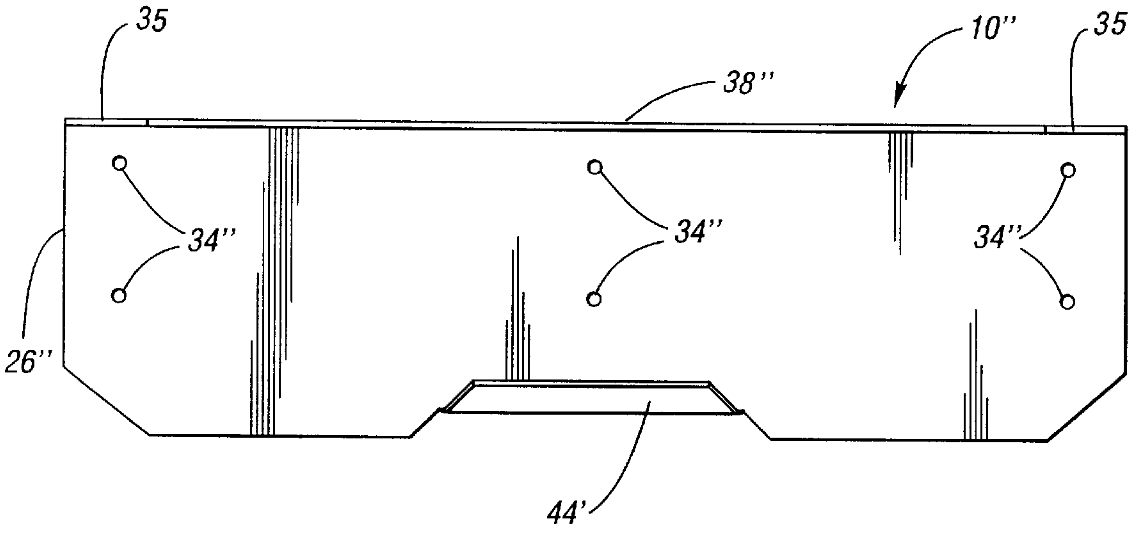
FIG. 5 is a front plan view of an alternative first form of the step ladder bracket.
Figure 6:
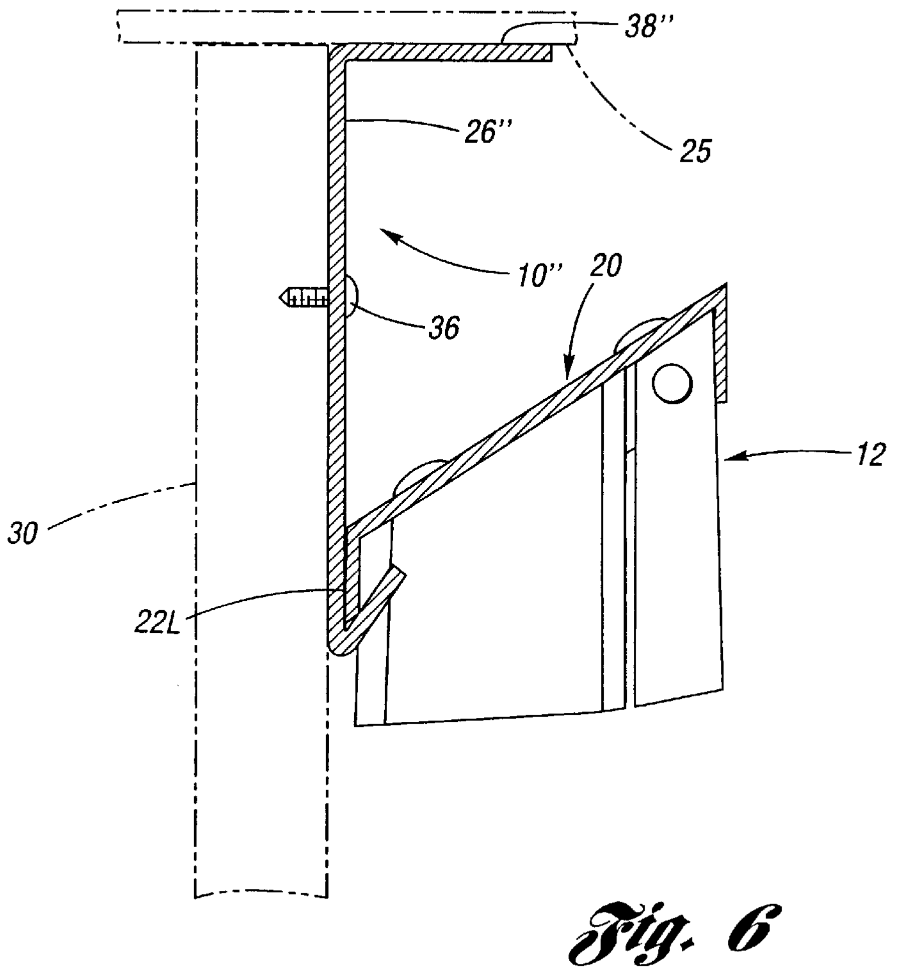
FIG. 6 is a partly sectional side view of a step ladder and the step ladder bracet of FIG. 5, shown mutually engaged.

FIGS. 5 and 6 depict an alternative form of the step ladder bracket 10", wherein the back plane 26" is wider than that shown at FIGS. 1 and 2. This wider back plane 26" allows for the stepped side of a step ladder 12 to be hung on the support flange 44', with sufficent clearance now being provided for the top step 20 with respect to the stiffening flange 38" (and ceiling 25). The stiffening flange 38" is now provided with a bevel 35 at each end. Holes 34", provide for a threaded fastener 36 to attach the back plane 26" to a vertical support member 30.

Examples of suitable structural dimensions of the step ladder bracket 10, 10', 10" will now be given merely by way of instruction and not limitation.

The step ladder bracket 10 has a back plane length of about eighteen inches, wherein the width (the distance between the upper and lower ends) of the back plane is about three and one-quarter inches, and the distance between the two holes is sixteen inches. The stiffening flange has a width of about one inch, and the single support flange has a width of about three-quarters of an inch and a length of about six inches along the base B thereof, and a length of about four and one-half inches along the distal tip T thereof. The acute angle of the support flange is about forty degrees and the convergent angle of the right and left back plane edges is about forty-five degrees. The material of construction is painted steel, with a sheet thickness of about one-sixteenth of an inch.

The step ladder bracket 10' has a back plane length of about fifty inches, wherein the width of the back plane is about three and one-quarter inches, and the distance between the two holes is forty-eight inches. The stiffening flange has a width of about one inch, and the two support flanges each have a width of about three-quarters of an inch, a length of about six inches along the base B thereof, and a length of about four and one-half inches along the distal tip T thereof. The support flanges are laterally spaced about eighteen inches apart as measured at the base B thereof. The acute angle of each support flange is about forty degrees, and the convergent angle of the right and left back plane edges is about forty-five degrees. The material of construction is painted steel, with a sheet thickness of about one-sixteenth of an inch.

The step ladder bracket 10" has a back plane length of about eighteen inches, wherein the width of the back plane is about five and one-quarter inches, and the distance between two left and right holes is sixteen inches. The stiffening flange has a width of about three-quarters of an inch and is beveled at about forty-five degrees at each end, and the single support flange has a width of about three-quarters of an inch and a length of about six inches along the base B thereof, and a length of about four and one-half inches along the distal tip T thereof. The acute angle of the support flange is about forty degrees and the convergent angle of the right and left back plane edges is about forty-five degrees. The material of construction is painted steel, with a sheet thickness of about one-sixteenth of an inch.

Figure 4:
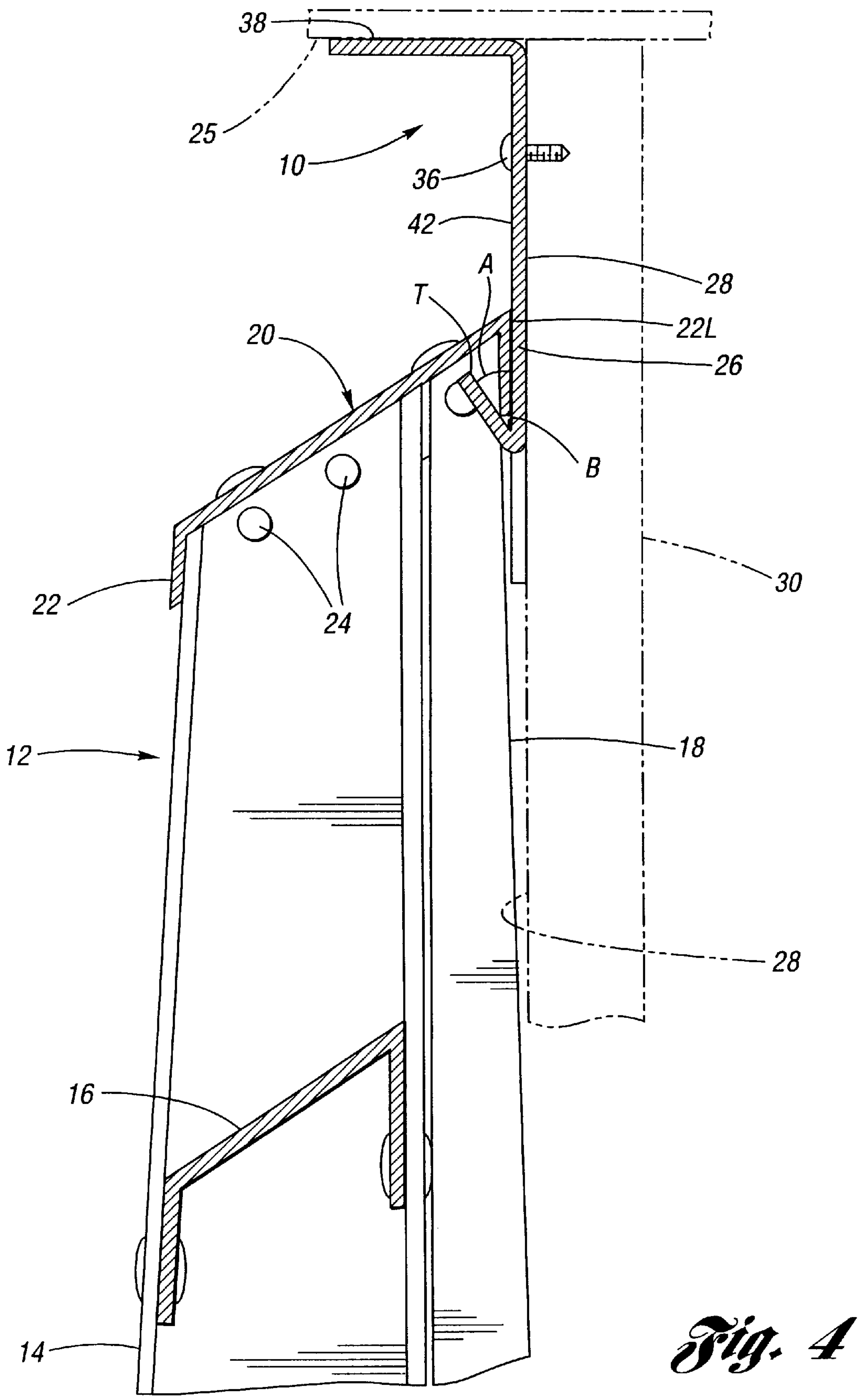
FIG. 4 is a partly sectional side view of the step ladder and step ladder bracket of FIG. 1, now shown mutually engaged.

Referring now in particular to FIGS. 1, 4 and 6, operation of the step ladder bracket 10, 10', 10" will now be detailed.

A user mounts the back plane to a wall so that the back plane, and consequently the support flange, is level, wherein the rear face abuts the wall and fasteners connect the back plane securely to the wall. Now, the one or more support flanges will project outwardly from the wall at an acute angle upwardly from the floor and toward the upper end of the back plane.

To cause a step ladder to engage the step ladder bracket so as to support the step ladder in close adjacency to the wall, a user first folds the step ladder into its closed configuration. Next, the user lifts the step ladder (top step up) and places a long lip section 22L of the perimeter lip just over the support flange 44, wherein the long lip section is generally parallel to the support flange. Finally, the user lowers the step ladder so that the support flange receives the long lip section between the adjacent short lip sections 22S at either side thereof. Now the perimeter lip of the step ladder is resting against the support flange and is supported vertically by either the edge of the perimeter lip contacting the base B of the support flange, or alternatively, the distal tip T of the support flange resting against the top step 20, whereupon the step ladder is stably positioned against the wall.

Usually, the user will want the long lip section adjacent the brace side to be used to interface with the support flange, in that when the step ladder is in the folded configuration, the long lip section adjacent the brace side is elevated with respect to the long lip section adjacent the stepped side. However, as shown at FIG. 6, the long lip section at the stepped side of the step ladder may be used. And, in the case where more than one support flange is present, a step ladder may be respectively supported on each simultaneously.

The user need only raise the step ladder off the support flange to again use the step ladder.

To those skilled in the art to which this invention appertains, the above described preferred embodiment may be subject to change or modification. Such change or modification can be carried out without departing from the scope of the invention, which is intended to be limited only by the scope of the appended claims.

What is claims is:

1. A bracket for supporting a step ladder, the step ladder having a top step, the top step having a perimeter lip, said bracket comprising:

a back plane having an upper end, an opposite lower end, and a front side, and an opposite rear side;

a stiffening flange located at said upper end of said back plane for providing resistance against bending of said back, plane said stiffening flange projecting from said front side, wherein said stiffening flange extends along all of said front side of said back plane at substantially a right angle with respect thereto; and at least one support flange projecting from said front side and located adjacent said lower end of said back plane, said at least one support flange having an acute angle with respect to said front side of said back plane, said at least one support flange having a base adjoining said back plane, said support flange terminating remote from said base at a distal tip, said support flange at said base having a first length, said support flange at said distal tip having a second length, said first length being longer than said second length;

wherein said bracket is formed of a single piece of sheet material.

2. The bracket of claim 1, wherein said at least one support flange has a length along said base thereof of substantially between four and eight inches.

3. The bracket of claim 1, wherein said at least one support flange comprises:

a first support flange; and a second support flange laterally separated from said first support flange.

4. A method for hanging a step ladder on a wall, wherein the step ladder has at least one long lip section of a perimeter lip at a top step thereof, said method comprising:

providing a metal sheet having a front side, and opposite rear side, an upper end and a lower end;

cutting the metal sheet at the lower end thereof to provide a flange having a pair of mutually spaced apart left and right flange edges which are mutually convergently angled so as to thereby provide a distal tip of said flange and a base of said flange wherein the base is longer than the distal tip;

bending the flange at the base between the left and right flange edges to thereby configure the flange into a support flange projecting from said front side of said metal sheet at an acute angle with respect thereto;

bending said metal sheet at the upper end thereof to thereby form a stiffening flange projecting from said front side at an angle substantially perpendicular thereto; and securing the rear side of the metal sheet substantially levelly to a wall a predetermined distance from a floor, wherein the support flange acutely angles upward in relation to the floor; and placing a long lip section of a step ladder receivingly onto the support flange so that the step ladder rests upon the support flange, wherein the long lip section has a length;

wherein the spacing between the left and right flange edges is predetermined so as to be less than the length of the long lip section.

5. The method of claim 4, wherein said step of securing comprises placing the stiffening flange abutingly against a ceiling to thereby level said sheet.

* * * * *